Dec. 31, 1935.  G. S. LANE  2,025,873
BRAKE SURFACE
Filed Feb. 23, 1932
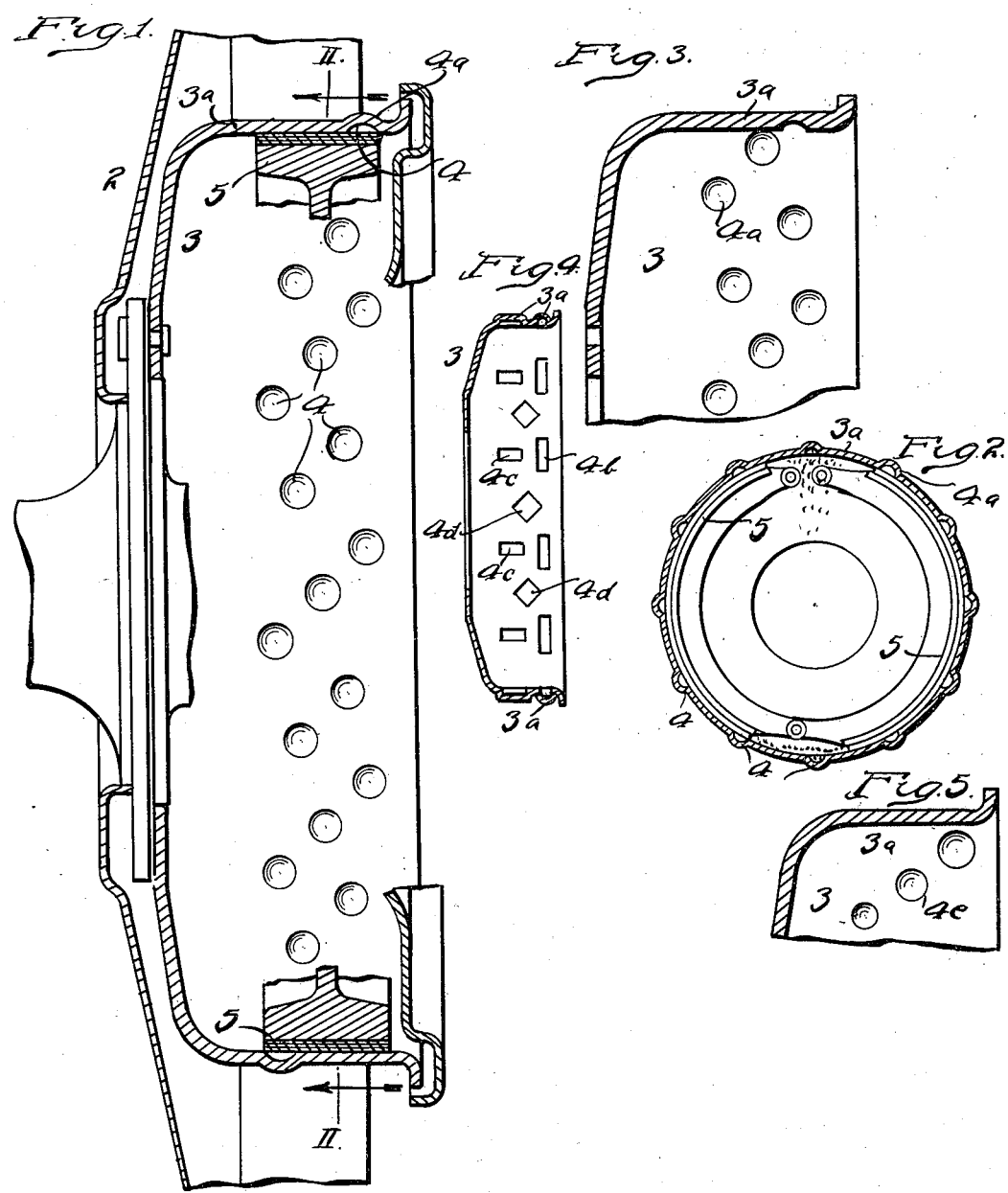
INVENTOR.
George S. Lane
BY Elliott Stoddard
ATTORNEY.

Patented Dec. 31, 1935

2,025,873

UNITED STATES PATENT OFFICE 2,025,873

BRAKE SURFACE

George S. Lane, Ridgewood, N. J., assignor to Arlington Sales Co., Utica, N. Y.

Application February 23, 1932, Serial No. 594,533

3 Claims. (Cl. 188—218)

My invention relates to the construction of friction surfaces such as are used in brake drums and clutch plates for automobiles.

This invention relates specifically to a form of brake drum or clutch plate or other friction surface, whereby the effective friction torque is materially increased and the scoring of the metal face, or faces, is greatly reduced and the structure stiffened and strengthened against warping.

Other objects and advantages are to provide a structure that will tend to maintain the proper "film" between the friction surfaces.

One of the prime objects of this invention is the provision in one or both of the friction surfaces of recesses or indentations to receive abrasive material as it is abraded from the rubbing surfaces, the recesses being so formed as to receive these destructive particles when they pass such recess. Friction surfaces are liable to be subjected to uneven and localized pressures, causing a local heating and breaking down of one or both of the contacting surfaces. It is an object of this invention to obviate this destructive condition.

It has been determined that the performance of the common friction units of automobile brakes and clutches ordinarily consisting of one metallic surface opposed to a compounded asbestos friction material is greatly improved if a film of dust can be maintained between the two rubbing surfaces. It is a purpose of this invention to aid in maintaining such a film, thereby increasing the coefficient of friction and reducing the scoring tendency of the two contacting surfaces.

In the accompanying drawing:—

Figure 1 is a sectional view of a brake apparatus partly broken away and so much of an automobile wheel as is necessary to show its connection therewith.

Figure 2 is a section in the plane indicated by the arrows 2, 2, Figure 1.

Figure 3 is a partial sectional view of a brake drum showing a modified construction.

Figure 4 is a sectional view of a brake drum showing a construction embodying my invention and illustrating its adaptability to designing the drum for a desired uniformity of strength and flexibility.

Figure 5 is a small detail view of a portion of a brake drum embodying my invention with a modified construction by which the resiliency of the drum flange may be modified.

2 is a disc wheel and 3 is the brake drum within said wheel. 3a is the flange of the drum, having the inner surface adapted to receive the friction from the brake shoes.

5, 5 are the contacting shoes of an expanding brake having the usual asbestos compound friction surface. Portions of the flange 3a are pressed outward to form cavities 4 in the inner surfaces and convexities 4a on their outer surfaces. The concavities 4, in Figure 1, are shown as arranged in slanting transverse series of 3 and 2, staggered so that the cavities in the two series shall be in line with the spaces between the center and exterior cavities of the three cavity series. These cavities extend over the surface contacted by the outer surface of the brake shoes 5.

If desired, though less advantageously, the concavities 4 may be simply formed in the inner surface without bending the outer surface of the drum. This is illustrated at 4a in Figure 3.

In order to regulate the resilience and rigidity, the flange 3a may be pressed, or cast, in different forms, as illustrated in Figure 4, where long indentations 4b are pressed out adjacent to the outer edge of the flange 3a where such flange is obviously not as rigid as at the inner edge, or web. These convexities 4a form reinforcing portions of the drum.

At the inner edge of the flange 3a indentations, or concavities, 4c are formed with their longer axis transverse to the flanges 3a, so that they do not retard the resilience of the flanges at this edge as much as at the outer edge.

An intermediate depression of a different form, say that of a diamond, as shown in 4d, Figure 4, may be used.

Figure 5 indicates circular cavities and convexities of varying diameter to regulate the rigidity or resilience of the brake drum, the flange being of uniform or of irregular thickness.

The action of the friction surfaces produces a dust which may be gathered in the lower concavities 4 of the flange 3a as indicated in Figure 2. As the drum turns, these concavities, partly filled with dust, are carried up, distributing the dust on the friction surfaces.

The indents also tend to liberate or distribute the dust upon the contacting surface and to provide a receptacle wherein abraded or foreign particles may escape from the rubbing surfaces to which they would otherwise be confined with consequent scoring of the surface or surfaces.

The concavities rising from the outer surface of the flange 3 facilitates the dissipating of the heat inasmuch as they present a greater cooling surface, and, furthermore, act in a similar manner to small fan blades or fins causing an increase in the cooling effect beyond the mere increase in area.

This construction will obviate scoring of the surfaces, increase the coefficient of friction, maintain the proper film of dust between the surfaces, and be superior in the point of simplicity, inexpensiveness of construction, positiveness of operation and facility, and convenience in use and in general efficiency.

It is understood that the described construction is not limited to pressed steel members but may be used with cast members, or members of non-uniform thickness in flange or other portion.

It will be understood that it is desired to secure this invention in the broadest form possible and not to limit it within narrower limits than the invention warrants.

What I claim as my invention is:—

1. In a brake construction the combination of two cylindrical coacting friction surfaces having horizontal axes, one of said surfaces being of asbestos compound composition and the other of said surfaces of metal provided with concavities having edges wholly in said surface distributed over said surface.

2. In a brake apparatus, two cylindrical parts one of which is of metal, one of said parts being adapted to rotate with reference to the other of said parts, and having contiguous surfaces and horizontal axes, said rotating metal part being provided with a plurality of concavities wholly within said surface and having continuous walls and opening through said surface and arranged in staggered relation to each other.

3. In a brake apparatus, two cylindrical parts one of which is of metal having contiguous surfaces and horizontal axes, the surface of one of said parts being adapted to rotate relative to the other of said parts and said metal part being provided with a concavity wholly within said surface and adapted to receive dust and distribute it over the operative part of its said surface.

GEORGE S. LANE.